United States Patent

Jonner

[11] 4,053,188
[45] Oct. 11, 1977

[54] CIRCUIT ARRANGEMENT FOR ANTILOCKING CONTROL SYSTEM

[75] Inventor: Wolf-Dieter Jonner, Sandhausen, Germany

[73] Assignee: Teldix GmbH, Heidelberg, Germany

[21] Appl. No.: 753,426

[22] Filed: Dec. 22, 1976

[30] Foreign Application Priority Data

Dec. 24, 1975 Germany .............................. 2558712

[51] Int. Cl.² .............................................. B60T 8/10
[52] U.S. Cl. ....................................... 303/96; 303/109
[58] Field of Search ......................... 303/109, 96, 106

[56] References Cited

U.S. PATENT DOCUMENTS 3,832,008  8/1974  Leiber ................................. 303/109

Primary Examiner—Trygve M. Blix
Assistant Examiner—Reinhard J. Eisenzopf
Attorney, Agent, or Firm—Spencer & Kaye

[57] ABSTRACT

A circuit arrangement for providing the reference value for generating the slip signals used to control the brake pressure in an antilocking control system for the wheel brakes of a vehicle, from the value of two wheel speed signals. A selector circuit feeds the wheel signal with the greater value to a memory to cause the memory to store this greater value as a reference value. A comparison circuit compares the values of each of the two wheel speed signals with the value stored in the memory and emits respective output signals whenever the value of either of the wheel speed signals exceeds or falls below the value stored in the memory. A logic circuit, which is responsive to the output signals from the comparison circuit and to signals indicating that the pressure control devices associated with the wheels from which the wheel speed signals are derived have responded, causes the reference value stored in the memory to be selectively varied according to one of a plurality of different time constants.

15 Claims, 3 Drawing Figures

CIRCUIT ARRANGEMENT FOR ANTILOCKING CONTROL SYSTEM

BACKGROUND OF THE INVENTION

The present invention relates to an antilocking control system for vehicle brakes. More particularly the present invention relates to an antilocking control system for vehicle brakes of the type in which slip signals are derived in order to vary the brake pressure, and a reference value is formed to obtain such slip signals in that a value which depends on the wheel velocity is fed to a memory whose content can be varied, either in an increasing or decreasing manner, according to various time constants wherein, in the case of braking, there is provided a first negative time constant which produces a very rapid decrease of the reference value in the memory in order to provide a very rapid matching of a higher reference value to the wheel speed value, a second negative time constant which produces a very slow reduction of the reference value in the memory corresponding to the decrease in the vehicle speed on ground with low coefficient friction $\mu$ and a third positive time constant for the relatively rapid increase in the reference value in the memory to provide a relatively rapid matching of the reference value to a greater wheel speed value.

Such an antilocking control system is disclosed, for example, in U.S. Pat. No. 3,832,008, published Aug. 27, 1974, the subject matter of which is incorporated herein by reference.

SUMMARY OF THE INVENTION

It is the object of the present invention to improve on the teaching of the above-mentioned U.S. Patent and to provide an even more advantageous reference value curve for an antilocking control system.

This is accomplished by the present invention in that in an antilocking control system for the wheel brakes of a vehicle wherein signals dependent on the rotational behavior of the wheels of the vehicle are evaluated to produce control signals, including slip signals, for controlling control members associated with the wheel brakes of the vehicle to vary the brake pressure, a novel circuit arrangement for providing the reference value for generating the slip signals is included in the evaluation circuit. According to the invention this novel circuit arrangement includes: a memory for storing the reference value; first and second signal inputs for receiving respective first and second input signals whose values are dependent on the respective rotational speeds of two different wheels of the vehicle; a selector circuit, connected to the first and second signal inputs, for feeding the one of the first and second input signals with the greater value to the memory to cause the memory to store the greater value; a comparison circuit, connected to the first and second inputs and to the memory, for comparing the values of the first and second signals with the value of the reference signal stored in the memory and for emitting respective output signals whenever the value of either of the first and second signals exceeds or falls below the value of the reference signal stored in the memory; third and fourth signal inputs for receiving respective signals indicating that the control members associated with the wheels from which the first and second signals are derived have responded; and a control logic circuit, which is responsive to the output signals from the comparison circuit and to signals at the third and fourth signal inputs, for controlling the memory to cause the reference value stored in the memory to be selectively varied according to either a first negative time constant for rapidly decreasing the value in the memory whereby a very rapid matching of a higher reference value to the rotational speed of the wheel will be effected, or a second negative time constant for very slowly reducing the value in said memory whereby a very slow reduction in the reference value corresponding to a decrease in the speed of the vehicle on ground having a small coefficient of friction will be effected, or a third positive time constant for relatively rapidly increasing the value in the memory whereby a relatively rapid matching of the reference value with a greater rotational speed of a wheel will be provided. The control logic circuit causes the reference value stored in the memory to be varied according to the first time constant when the comparison circuit produces output signals indicating that the value of both of the first and second signals is less than said reference value stored in the memory; the second time constant when the comparison circuit produces output signals indicating that the value of both of the first and second signal is less than the reference value and signals are present at the third and fourth signal inputs indicating that both control members have responded; and the third time constant, when the comparison circuit produces output signals indicating that the value of at least one of the first and second signals is greater than the stored reference value.

According to the present invention the signals derived from two wheels are utilized to form the reference value for the slip measurement of these wheels. The wheels of one axle, of one side of the car and particularly the wheels which are diagonal to one another can be selected for this purpose.

Advantageously the above-mentioned switching devices of the control logic circuit which effects the switching in of the first time constant are effective independently of whether the vehicle brakes are being activated or not. This may also apply for the switching devices which make the second time constant effective.

Preferably, in addition to the three time constants mentioned above, the control logic circuit also can provide a fourth time constant having a positive sign which permits the reference value in the memory to increase only very slowly. This fourth time constant is made effective to control the memory by the logic circuit in both wheel speed values exceed the reference value in the memory at least by a certain value $(+\lambda)$. The second and fourth time constants may be of the same magnitude and may differ only as to their sign.

Finally, according to a further feature of the invention, the control logic circuit also provides a fifth time constant which has a positive sign and whose magnitude lies between the fourth and the third time constants. This fifth time constant is made effective by the logic circuit if either of the wheel speed values is greater than the reference value in the memory and neither of the wheel speed values deviates from this reference value by more than the predetermined value $(+\lambda)$.

The various time constants may be selected according to the following example. It is to be understood however, that the relative time constants set forth below are by way of example only and are not be considered as having any limiting characteristic. According to this example, the time constants can correspond to the following decelerations or accelerations, measured in multiples of the earth's acceleration:

first time constant: $T_1 \rightarrow -10$ g
second time constant: $T_2 \rightarrow -0.3$ g
third time constant: $T_3 \rightarrow +2.5$ g
fourth time constant: $T_4 = -T_2 \rightarrow +0.3$ g
fifth time constant: $T_5 \rightarrow +1$ g According to a further feature of the invention a switching arrangement may be provided which makes the speed value derived from a wheel ineffective for the formation of the reference value if this value deviates from the reference value then in the memory by more than a given or predetermined value so that then the other wheel speed value alone forms the reference value.

In a digital embodiment of the evaluation circuit the memory of the circuit arrangement according to the invention may be a forward-backward counter where the sign of the time constant determines the direction of counting and the value of the time constant determines the counting speed. Alternatively, if an arithmetic unit and registers are used for the memory, then the sign of the time constant determines whether addition or subtraction is to take place and the value of the time constant determines the frequency of the addition or subtraction of an amount and/or the value of the amount to be added or subtracted.

DETAILED DESCRIPTION OF THE PREFERRED EMBODIMENTS

Figure 1:
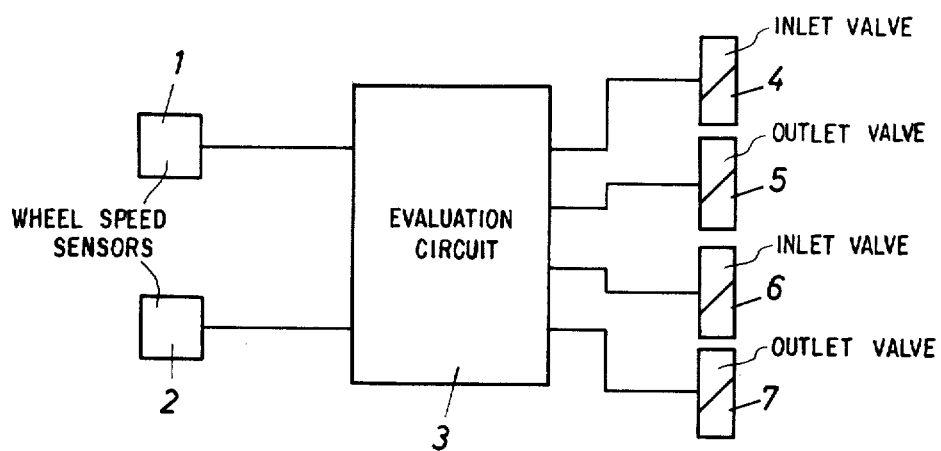
FIG. 1 is a block circuit diagram showing generally an antilocking control system for the wheel brakes for two wheels of a vehicle.

Referring now to FIG. 1, as is conventional the antilocking control system includes a pair of wheel speed sensors 1 and 2, which are associated, for example, with two diagonal wheels of the vehicle and which produce a pulse sequence dependent on the speed of the associated wheels. The output signals from the sensors 1 and 2 are fed to the evaluation circuit 3, which is preferably an electronic circuit, where in a manner known in the art slip signals are formed from the wheel speed signals and a reference speed signal. The output signals produced by the evaluation circuit are fed to control inlet valves 4 and 6 as well as outlet valves 5 and 7. The valves 4 and 5 are associated with the wheel associated with sensor 1 while the valves 6 and 7 are associated with the wheel associated with sensor 2.

Figure 2:
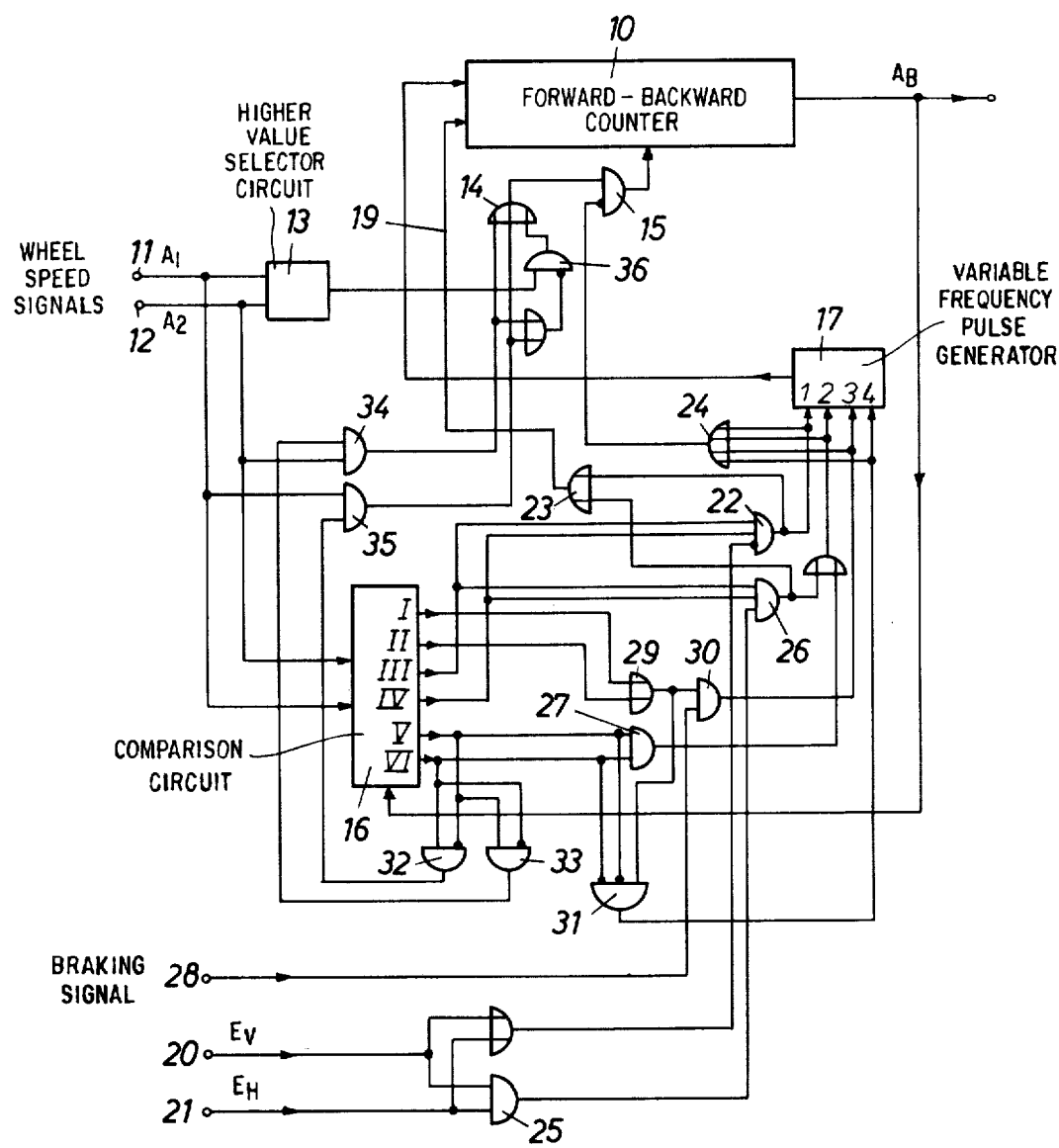
FIG. 2 is a logic circuit diagram of a preferred embodiment of a circuit arrangement according to the present invention for forming the reference value for generating slip signals in an antilocking control system as shown in FIG. 1.

Referring now to FIG. 2, there is shown, in detail, the portion of the evaluation circuit of FIG. 1 for providing the reference value for the formation of the slip signals. The reference value is, as mentioned above, formed in a memory which in the illustrated embodiment of FIG. 2 is realized by a forward-backward digital counter 10.

The digital values corresponding to the two wheel speeds are fed to the circuit arrangement of FIG. 2 via respective signal input terminals 11 and 12. The signals appearing at terminals 11 and 12 are fed to a selector circuit 13 which selects the higher one of these two values and feeds it, via a normally enabled AND gate 36, an OR gate 14 and a normally enabled AND gate 15, to the setting input of counter 10, which then sets itself to the value it receives via OR gate 14 as long as AND gate 15 is not blocked.

The wheel speed signals appearing at terminals 11 and 12 are also fed to comparison stage 16 which has a further input connected to the output of the counter 10. The comparison circuit 16 compares the values corresponding to the wheel speeds with the reference value from the output of counter 10 and produces signals at its various outputs indicating the results of the comparisons. Comparison stage 16 has six ouputs I–VI and emits a signal on the individual outputs under the following conditions, where $A_1$ is the value corresponding to the speed of one wheel;

$A_2$ is the value corresponding to the speed of the other wheel;

$A_B$ is the reference value at the output of the counter; and $+\lambda$ indicates that the value $A_1$ or $A_2$ exceeds the value $A_B$ by the amount $\lambda$.

| Output | Signal if |
| --- | --- |
| I | $A_1 > A_B$ |
| II | $A_2 > A_B$ |
| III | $A_1 < A_B$ |
| IV | $A_2 < A_B$ |
| V | $A_1 > A_B + \lambda$ |
| VI | $A_2 > A_B + \lambda$ |

The outputs of the comparison stage 16 are connected via various logic switching elements to a circuit 17 having four inputs, and an output connected to the counting input of counter 10. Circuit 17 may be a pulse generator with a connected adjustable frequency divider or a switchable pulse generator. Circuit 17, depending on through which one of its inputs 1 through 4 it is controlled, emits pulse trains of different pulse repetition frequency to the counter 10. In the illustrated embodiment circuit 17 produces an output pulse train with a very high pulse repetition frequency (corresponding to 10 g) if input 1 is controlled, i.e., receives an input signal, with a very low pulse repetition frequency (corresponding to 0.3 g) if input 2 is controlled, with a medium pulse repetition frequency (corresponding to 2.5 g) if input 3 is controlled, and with a somewhat lower repetition frequency (corresponding to 1 g) if input 4 is controlled. The pulses emitted when generator 17 is enabled are fed to the counting input of counter 10 and there effect a stepwise change in the stored value. The direction of counting (forward or backward) is determined by whether line 19 carries a signal or not; it is assumed in this connection that counter 10 counts forward if there is no signal in line 19 and that it is switched to backward counting if there is a signal in line 19.

The first time constant $T_1$ (corresponding to 10 g) is made effective if both values $A_1$ and $A_2$ are less than the reference value $A_B$ and neither of the inlet valves 4 or 6 of FIG. 1 has responded. These control signals $E_v$ and $E_H$ for the inlet valves 4 and 6 are coupled in at terminals 20 and 21. The rapid downward matching with the very small time constant takes place if both wheel speeds become more distant from the reference value but no regulation is effective. This switching is realized by means of AND gate 22 which receives the signals from outputs III and IV of comparison stage 16 and which then, if the valves 4 and 6 are not actuated causing no signal to be applied to the inverting input of AND gate 22, emits an output signal which is fed to input 1 of circuit 17 and makes time constant $T_1$ effective. Moreover, counter 10 is switched via OR gate 23 to backward counting so that the value stored in counter 10 is reduced at a relatively high speed as long as the signal is present at input 1. During this time and during any other time in which generator 17 is actuated by means of a signal at any of its inputs 1-4, AND gate 15 is blocked via OR gate 24 and thus it is not possible during this time to reset the value in the counter 10 to a wheel speed value appearing at terminal 11 or 12.

Time constant $T_2$ ($\approx 0.3$ g) is made effective via a signal at input 2 of circuit 17 if again both values $A_1$ and $A_2$ fall below the reference value $A_B$ and additionally valves 4 and 6 have responded and are also controlled as indicated by signals at terminals 20 and 21. In this case a control signal for input 2 of circuit 17 is generated by means of AND gates 25 and 26. Additionally, the control signal at the output of AND gate 26 is fed via OR gate 23 and line 19 to counter 10 to again cause the counter 10 to count backward. With this type of control, which becomes effective when braking leads to locking, the memory value $A_B$ in counter 10 is reduced very slowly, i.e. with a small slope.

The fourth time constant $T_4$, which is of the same value as time constant $T_2$ but with a positive sign, is made effective if both wheels rotate by more than the value $\lambda$ above the reference value, in which case signals are present at outputs V and VI of comparison stage 16. Here it must be assumed that such state can happen only if the system is connected to act as an axle control at a driven axle. The control signal required in this case for input 2 of circuit 17 is generated by means of AND gate 27.

A third time constant $T_3$ (corresponding to $\sim 2.5$ g) is made effective by the application of a control signal to input 3 of circuit 17 if during braking, as indicated by a signal at terminal 28 one or both wheel speed values $A_1$ and $A_2$ become greater than the reference value $A_B$, causing signals to appear at outputs I and/or II of comparison stage 16. In this case the reference value $A_B$ follows this wheel value relatively quickly because in this case it must be assumed that the reference value is wrong. The control signal required to effect this type of control is practiced by OR gate 29 and AND gate 30.

Finally, the value in the memory, i.e. counter 10, can be varied according to a further fifth time constant $T_5$ which corresponds to an acceleration of + 1g and is made effective by means of a control signal to input 4 of circuit 17, if either of the wheel signal values $A_1$ and $A_2$ is greater than the reference value $A_B$ and the value ($A_B$ + $\lambda$) has not as yet been exceeded. This condition, which corresponds to the usual acceleration, becomes effective particularly in the case of acceleration when the driving wheel is subject to positive slip. The required control signal for input 4 of circuit 17 is generated by an AND gate 31 which has two inverting inputs connected to the outputs V and VI of comparison stage 16 and a conventional non-inverting input connected to the output of OR gate 29.

In addition to the above-described circuitry, the circuit of FIG. 2 also includes circuitry for preventing the higher of the two input values $A_1$ and $A_2$ appearing at terminals 11 and 12 and as selected by circuit 13 from being fed to the setting input of counter 10 if the higher signal value $A_1$ or $A_2$, e.g. $A_1$, exceeds the value ($A_B$ + $\lambda$), and for then feeding the other wheel value, e.g. $A_2$, to the setting input of counter 10 to form the new reference value. For this purpose two AND gates 32 and 33, each having an inverting input, are provided and connected to the outputs V and VI of comparison stage 16 so that gate 32 emits a singal if only $A_2$ is greater than ($A_B$ + $\lambda$) and gate 33 emits a signal if only $A_1$ is greater than ($A_B$ + $\lambda$). The output of AND gates 32 and 33 are connected to the enabling inputs of AND gates 35 and 34 respectively. Depending on which one of the AND gates 34 and 35 is enabled by an output signal from one of the AND gates 33 and 32 respectively, the associated signal value $A_2$ or $A_1$ respectively is fed to the setting input of counter 10 via OR gate 14 and normally enabled AND gate 15, and simultaneously is fed to the inverting input of AND gate 36 to block same, rendering the higher value output signal from the circuit 13 ineffective to set the counter 10. In this arrangement the connections are such that the smaller of the signal values $A_1$ and $A_2$ reaches the counter 10 via one of the AND gates 34 and 35 to set the counter to this value unless, of course, the circuitry is causing a change in the value in counter 10 according to the effective time constant, in which case the AND gate 15 is blocked via an output signal from OR gate 24.

Figure 3:
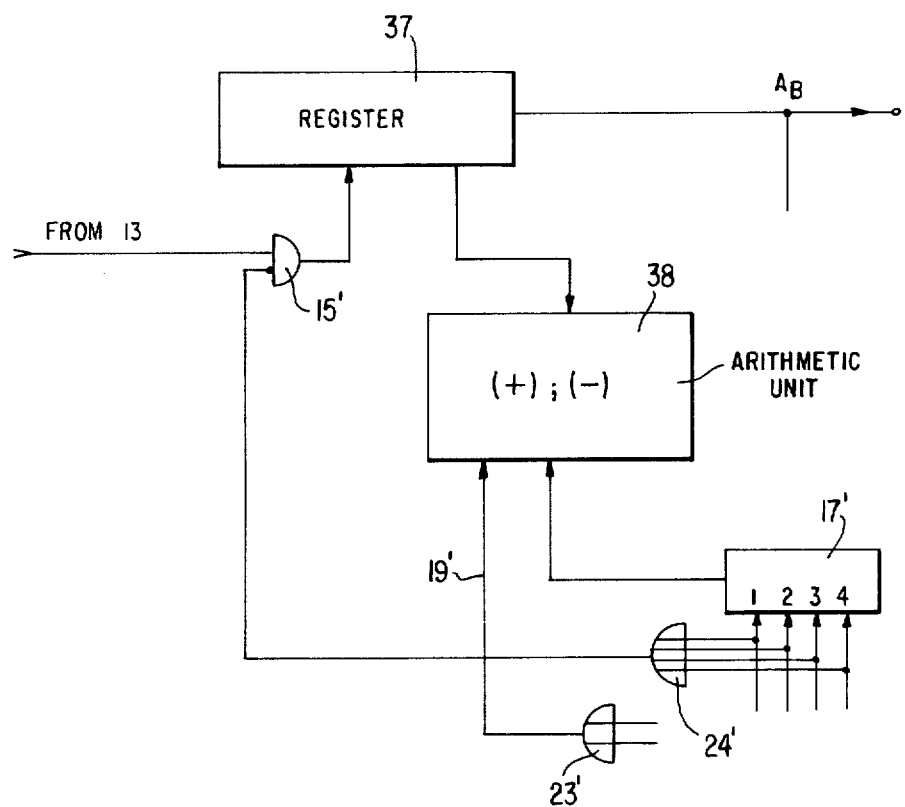
FIG. 3 is a circuit diagram of an other embodiment.

In FIG. 3 an alternative embodiment of the invention is shown in part. Here the forward-backward-counter 10 is replaced by register 37 and an arithmetic unit 38. The other part of this embodiment (not shown) may be similar to that of FIG. 1. The output signal of selector 13 is fed via AND-gate 15', corresponding to gate 15 of FIG. 2, to the register 37. The pulses of circuit 17' — which works similar to the circuit 17 of FIG. 2 — are fed to the unit 38, in which — when a pulse from circuit 17' occurs — a given small amount is added to or subtracted from the reference value stored in register 37; then the value obtained by means of this addition or subtraction is restored in register 37 as a new reference value. Whether an addition or subtraction takes place depends on the fact, if via line 19' a signal or no signal from gate 23', which corresponds to gate 23 of FIG. 2 is fed to unit 38. Thus the pulses of circuit 17' are decisive of how often the reference value is changed while the signal on line 19' determines if an addition or a subtraction takes place.

It is to be understood that although the invention has been specifically described with respect to a digital embodiment of the circuit arrangement, the invention is also applicable to evaluation circuits utilizing analog signals wherein, for example, the capacitor memory is utilized.

It will be understood that the above description of the present invention is susceptible to various modifications, changes and adaptations, and the same are intended to be comprehended within the meaning and range of equivalents of the appended claims.

What is claimed is:

1. For use in an antilocking control system for the wheel brakes of a vehicle wherein signals dependent on the rotational behavior of the wheels of the vehicle are evaluated to produce control signals, including slip signals, for controlling control members associated with the wheel brakes of the vehicle to vary the brake pressure, a circuit arrangement for providing a reference value for generating the slip signals comprising in combination:

a memory for storing said reference value;

first and second signal inputs for receiving respective first and second input signals whose values are dependent on the respective rotational speeds of two different wheels of the vehicle;

selector circuit means, connected to said first and second signal inputs, for feeding the one of said first and second input signals with the greater value to said memory to cause said memory to store said greater value;

comparison circuit means, connected to said first and second inputs and to said memory, for comparing the values of said first and second signals with the value of the reference signal stored in said memory and for emitting respective output signals whenever the value of either of said first and second signals exceeds or falls below the value of the reference signal stored in said memory;

third and fourth signal inputs for receiving respective signals indicating that the control members associated with the wheels from which said first and second signals are derived have responded; and logic circuit means, responsive to the output signals from said comparison circuit means and to signals at said third and fourth signal inputs, for controlling said memory to cause said reference value stored in said memory to be selectively varied according to either a first negative time constant for rapidly decreasing the value in said memory whereby a very rapid matching of a higher reference value to the rotational speed of the wheel will be effected, a second negative time constant for very slowly reducing the value in said memory whereby a very slow reduction in the reference value corresponding to a decrease in the speed of the vehicle on ground having a small coefficient of friction will be effected, or a third positive time constant for relatively rapidly increasing the value in said memory whereby a relatively rapid matching of the reference value with a greater rotational speed of a wheel will be provided; said logic circuit means including switching means for causing said reference value stored in said memory to be varied according to a. said first time constant when said comparison circuit means produces output signals indicating that the value of both of said first and second signals is less than said reference value;

b. said second time constant when said comparison circuit means produces output signals indicating that the value of both of said first and second signals is less than said reference value and signals are present at said third and fourth signal inputs indicating that both control members have responded; and c. said third time constant when said comparison circuit means produces output signals indicating that the value of at least one of said first and second signals is greater than said reference value.

2. A circuit arrangement for an antilocking control system as defined in claim 1 wherein said first and second signals are derived from the wheels of one axle of the vehicle.

3. A circuit arrangement for an antilocking control system as defined in claim 1 wherein said first and second signals are derived from a driven wheel and a non-driven wheel of the vehicle.

4. A circuit arrangement for an antilocking control system as defined in claim 3 wherein said first and second signals are derived from wheels of the vehicle which are disposed diagonally opposite one another.

5. A circuit arrangement for an antilocking control system as defined in claim 1 wherein said logic circuit means is effective to cause said reference value stored in said memory to be varied according to said first time constant even if the vehicle is not being braked.

6. A circuit arrangement for an antilocking control system as defined in claim 1 wherein said logic circuit means is effective to cause said reference value stored in said memory to be varied according to said second time constant independently of the braking of the vehicle.

7. A circuit arrangement for an antilocking control system as defined in claim 1 wherein: said comparison circuit means additionally produces associated output signals whenever the value of either of said first and second signals exceeds the reference value stored in said memory by at least a predetermined value; said logic circuit means can selectively control said memory to vary the reference value stored in said memory according to a fourth time constant for very slowly increasing said reference value stored in said memory; and said switching means of said logic circuit means causes the reference value stored in said memory to be varied according to said fourth time constant when said comparison circuit means produces output signals indicating that the value of each of said first and second signals is greater than the reference value stored in said memory by at least said predetermined value.

8. A circuit arrangement for an antilocking control system as defined in claim 7 wherein said second and said fourth time constant have the same value and differ only by their sign.

9. A circuit arrangement for an antilocking control system as defined in claim 7 wherein: said logic circuit means can selectively control said memory to vary the reference value stored therein according to a fifth time constant for increasing the value in said memory faster than said fourth time constant but slower than said third time constant; and said switching means of said logic circuit means causes the value stored in said memory to be varied according to said fifth time constant when said logic circuit means receives input signals indicating that the value of at least one of said first and second signals is greater than the reference value stored in said memory and that the value of neither of said first and second signals exceeds the reference value stored in said memory by said predetermined value.

10. A circuit arrangement for an antilocking control system as defined in claim 1 wherein said comparison circuit means additionally produces associated output signals whenever the value of either of said first and second signals exceeds the reference value stored in said memory by at least a predetermined value; and further comprising further switching means, responsive to an output from said comparison circuit means indicating that the value of one of said first and second signals exceeds the reference value stored in said memory by more than said predetermined value, for blocking the output signals from said selector circuit means and for feeding the other of said first and second signals to said memory to cause said memory to store same.

11. A circuit arrangement for an antilocking control system as defined in claim 1 wherein: said circuit arrangement is a digital electronic circuit; said memory is a forward-backward counter and the sign of the effective time constant determines the counting direction and the value of the effective time constant determines the counting speed.

12. A circuit arrangement for an antilocking control system as defined in claim 1 wherein: said circuit arrangement is a digital electronic circuit; said memory includes memory registers and an adder; and the sign of the effective time constant determines an addition or subtraction of a value to or from the stored value, respectively, and the value of the time constant determines the frequency of the performance of this addition or subtraction, respectively, in the unit time and/or determines the amount to be considered in the addition or subtraction, respectively.

13. A circuit arrangement for an antilocking control system as defined in claim 1 wherein said switching means includes means for permitting said first time constant to become effective only if signals are not present at said third and fourth signal inputs indicating that neither control member has responded.

14. A circuit arrangement for an antilocking control system as defined in claim 1, further comprising a fifth signal input for receiving a signal indicating that vehicle braking is taking place; and wherein said switching means includes means for permitting said third time contant to become effective only if such a braking signal is present at said fifth input.

15. In an antilocking control system for the wheel brakes of a vehicle including a hydraulic system having wheel brakes for the individual wheels of the vehicle, pressure control means for controlling the brake pressure applied to said wheel brakes, sensor means for providing signals dependent on the rotational behavior of the wheels of the vehicle and an evaluation circuit means for evaluating the signals from said sensor means and for producing therefrom control signals, including slip signals, for said pressure control means to cause said pressure control means to vary the brake pressure at said wheel brakes to prevent locking of the associated wheels; the improvement wherein said evaluation circuit means includes said circuit arrangement defined in claim 1 for the generation of a reference signal for producing said slip signals.

* * * * *